United States Patent [19]

Motoyama

[11] Patent Number: 4,638,375
[45] Date of Patent: Jan. 20, 1987

[54] VIDEO SIGNAL RECORDING AND REPRODUCING APPARATUS

[75] Inventor: Tadashi Motoyama, Kanagawa, Japan

[73] Assignee: Sony Corporation, Tokyo, Japan

[21] Appl. No.: 613,572

[22] Filed: May 24, 1984

[30] Foreign Application Priority Data

May 25, 1983 [JP] Japan .................. 58-92139
May 25, 1983 [JP] Japan .................. 58-92140

[51] Int. Cl.$^4$ ..................... H04N 5/76; G11B 21/10
[52] U.S. Cl. ................................. 358/338; 369/44; 369/50; 358/322
[58] Field of Search ............. 358/320, 321, 322, 323, 358/337–339; 360/36.1, 36.2, 70; 369/47; 365/44, 48, 50, 111

[56] References Cited

U.S. PATENT DOCUMENTS

| | | | |
|---|---|---|---|
| 3,787,615 | 1/1974 | Foerster et al. | 360/70 X |
| 3,829,893 | 8/1974 | Baichtal | 360/73 |
| 3,934,262 | 1/1976 | Snopko | 358/323 X |
| 4,225,873 | 9/1980 | Winslow | 358/342 X |
| 4,290,122 | 9/1981 | Bates et al. | 369/46 X |
| 4,528,603 | 7/1985 | Abe | 360/70 |
| 4,544,957 | 10/1985 | Moriya et al. | 358/338 |

FOREIGN PATENT DOCUMENTS 0054413 6/1982 European Pat. Off. ........... 360/37.1
57-53188 3/1982 Japan .................. 358/322

Primary Examiner—Aristotelis M. Psitos
Attorney, Agent, or Firm—Lewis H. Eslinger; Alvin Sinderbrand

[57] ABSTRACT

A video signal recording and reproducing apparatus used with a disc as recording medium comprises a head assembly, a disc rotating drive for rotating the disc in relation to the head assembly, a signal path extending from an input terminal to which a video signal is supplied to be recorded to the head assembly, a first control circuit for controlling the disc rotating drive so as to vary the disc rotation in response to the phase of a synchronous signal, such as a horizontal synchronous signal in the video signal supplied to the input terminal, a variable delay provided in the signal path for delaying the video signal supplied to the input terminal to vary the time base thereof, and a second control circuit for controlling the delay time in the variable delay so as to vary the time base of the video signal derived from the variable delay in response to the phase of a reference signal, such as a horizontal reference signal reproduced from the disc through the head assembly.

8 Claims, 6 Drawing Figures

VIDEO SIGNAL RECORDING AND REPRODUCING APPARATUS

BACKGROUND OF THE INVENTION

1. Field of the Invention

This invention relates generally to apparatus for recording and reproducing a video signal, and more particularly, to a video signal recording and reproducing apparatus for recording a video signal on a disc with a spiral record track thereon and reproducing a video signal from a disc on which the video signal is recorded in a spiral record track.

2. Description of the Prior Art

There has been proposed a disc available for inscribing which has a spiral groove preformed on a recording surface thereof so as to be traced for tracking operation on the occasion of recording and on which an information signal can be recorded once in a spiral record track along the spiral groove. This disc available for inscribing can be used for recording a video signal thereon in an editing manner, for example, by a video signal recording apparatus. In such recording of the video signal on the disc available for inscribing in the editing manner, the disc loaded on the video signal recording apparatus is rotated at, for example, constant angular velocity and each segment of, for example, one field or frame period of the video signal is recorded in each turn of the spiral record track on the rotating disc successively with at least one intermission in which the disc may be unloaded from the video signal recording apparatus once and then reloaded thereon.

When a certain video signal is recorded on the disc available for inscribing in the editing manner as mentioned above by a previously proposed video signal recording apparatus, there may be caused phase differences between a horizontal synchronous signal in each segment of one field or frame period of the video signal recorded in a part of the spiral record track formed before the disc is unloaded in the intermission and a horizontal synchronous signal in each segment of one field and frame period of the video signal recorded in another part of the spiral record track formed after the disc is reloaded in the intermission due to, for example, eccentricity of the disc even though the rotation of the disc is controlled to be synchronized with a vertical synchronous signal (a field or frame synchronous signal) of the video signal being to be recorded, so that an arrangement of the horizontal synchronous signals recorded on the respective turns of the spiral record track in the direction of the radius of the disc, namely, a horizontal period alignment (H alignment) is not established properly.

In connection with this, when the video signal which is recorded on the disc with such phase differences in the horizontal synchronous signals as mentioned above and an improper horizontal period alignment is reproduced from the disc, there results undesirable jumping of the horizontal synchronous signal in the video signal reproduced from the junction area between a portion of the disc on which a part of the spiral record track is formed before the disc is unloaded and a portion of the disc on which another part of the spiral record track is formed after the disc is reloaded. Moreover, substantial crosstalk interference by the horizontal synchronous signals between two adjacent turns of the spiral record tracks, one of which is formed before the disc is unloaded and the other of which is formed after the disc is reloaded, is caused.

OBJECTS AND SUMMARY OF THE INVENTION

Accordingly, it is an object of the present invention to provide a video signal recording and reproducing apparatus for recording a video signal on a disc available for inscribing and reproducing a video signal from the disc, which avoids the above described problems encountered with the prior art.

Another object of the present invention is to provide a video signal recording and reproducing apparatus which can record a video signal on a disc available for inscribing to form a spiral record track thereon in the editing manner without phase differences between horizontal synchronous signals in the video signal recorded on each two adjacent turns of the spiral record track and can reproduce a video signal from the spiral record track on the disc.

A further object of the present invention is to provide a video signal recording and reproducing apparatus which can record a video signal on a disc available for inscribing to form a spiral record track thereon in the editing manner with a proper horizontal period alignment and can reproduce a video signal from the spiral record track on the disc.

According to an aspect of the present invention, there is provided a video signal recording and reproducing apparatus for recording a video signal on a disc available for inscribing with a spiral record track formed thereon and reproducing a video signal from the record track on the disc, which comprises a head assembly containing recording and reading portions, disc rotating means for driving the disc to rotate in relation to the head assembly, a signal path extending from an input terminal supplied with the video signal to be recorded to the recording portion in the head assembly, a first control circuit arrangement supplied with a first reference signal reproduced from the disc through the reading portion in the head assembly and a first synchronous signal in the video signal supplied to the input terminal, and operative to control the disc rotating means so as to cause the disc to have the rotation varying in response to the phase of the first synchronous signal, variable delay means provided on the signal path for delaying the video signal supplied to the input terminal to vary the time base thereof, and a second control arrangement supplied with a second reference signal reproduced from the disc through the reading portion in the head assembly and a second synchronous signal in the video signal in the signal path, and operative to control the delay time in the variable delay means so as to cause the video signal derived from the variable delay means to have the time base varying in response to the phase of the second reference signal.

With the video signal recording and reproducing apparatus thus constituted in accordance with the present invention, in the case where a video signal is recorded on a disc available for inscribing in the editing manner, the phase of the horizontal synchronous signal in the video signal recorded in the turns of a spiral record track on the disc formed later to be successive to the turns of the spiral record track previously formed is held to coincide with the phase of the horizontal synchronous signal in the video signal recorded in the turns of the spiral record track previously formed, so that the horizontal period alignment is properly established throughout the spiral record track on the disc even though the disc has an eccentric center of rotation. Accordingly, on the occasion of reproducing the video signal from the disc, such undesirable jumping of the horizontal synchronous signal in a reproduced video signal as mentioned above is avoided and crosstalk interference by the horizontal synchronous signal between two adjacent turns of the spiral record track is effectively reduced.

The above and other objects, features and advantage of the present invention will become apparent from the following detailed description taken in conjunction with the accompanying drawings.

DESCRIPTION OF THE PREFERRED EMBODIMENTS

Now, embodiments of video signal recording and reproducing apparatus according to the present invention will be described with reference to the accompanying drawings hereinafter.

Figure 1:
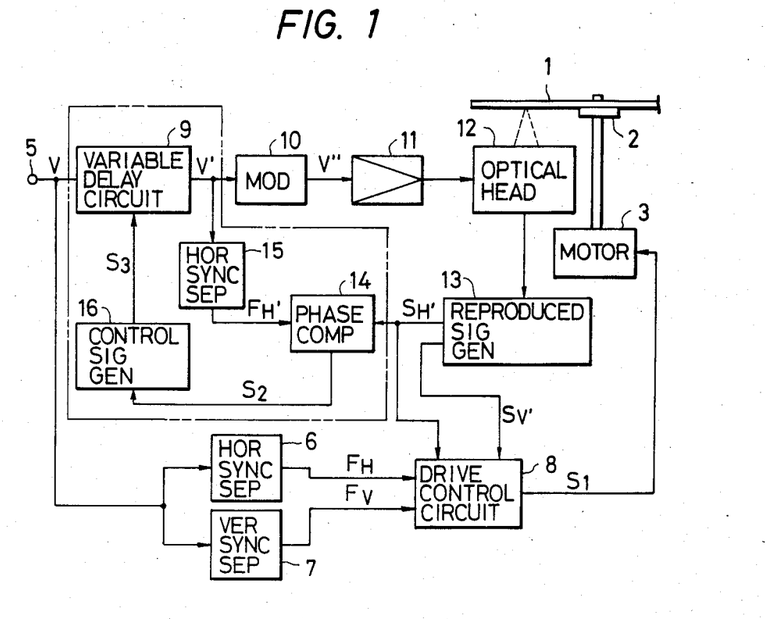
FIG. 1 is a schematic block diagram showing one embodiment of video signal recording and reproducing apparatus according to the present invention.

FIG. 1 shows one embodiment of a video signal recording and reproducing apparatus according to the present invention. This embodiment is formed into an optical video signal recording and reproducing apparatus which is operative to record a video signal optically on a disc available for inscribing and reproduce a video signal optically from the disc.

Figure 2A:
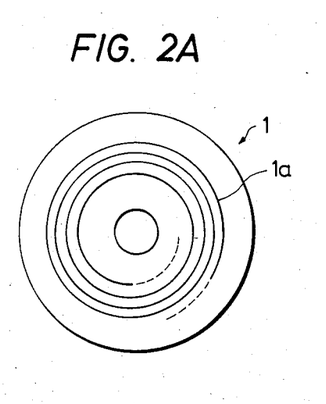
FIGS. 2A and 2B are schematic illustrations used for explaining a disc available for inscribing and used with the embodiment shown in FIG. 1.
Figure 2B:
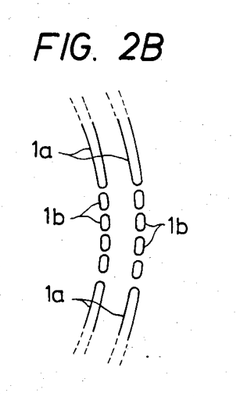

First, a disc 1 which is available for inscribing and used with this embodiment will be explained with reference to FIGS. 2A and 2B. As shown in FIG. 2A, the disc 1 has a spiral groove 1a which is preformed on a recording surface thereof for tracking operation on the occasion of recording and in which a reference signal is previously recorded. The reference signal is, for example, composed of horizontal and vertical reference signal components $S_H$ and $S_v$ corresponding to horizontal and vertical synchronous signals of a video signal, respectively, and recorded with an arrangement of pits 1b formed in predetermined portions of the spiral groove, as shown in FIG. 2B. On the recording surface of the disc 1, a photosensitive material which varies its light-reflectivity with exposure to, for example, a laser light is provided to cover the disc, so that a video signal is recorded optically to form a spiral record track thereon.

The disc 1 formed as described above is loaded on a disc holding portion 2 and rotated by a disc rotating motor 3 at a predetermined rotating speed.

An input terminal 5 to which a video signal V is supplied from the outside is provided to be connected to both input ends of a horizontal synchronous signal separating circuit 6 and a vertical synchronous signal separating circuit 7. Output ends of the horizontal and vertical synchronous signal separating circuits 6 and 7 are connected to first and second input ends of a disc rotation control circuit 8, respectively. Then, an output end of the disc rotation control circuit 8 is coupled with a control end of the disc rotating motor 3.

The input terminal 5 is connected also to an input end of a variable delay circuit 9 and an output end of the variable delay circuit 9 at which a delayed video signal V' is obtained is coupled with an input end of a modulating circuit 10 for performing, for example, a frequency modulation. An output end of the modulating circuit 10 is connected through a recording amplifier 11 to an input end of an optical head assembly 12.

The optical head assembly 12 comprises a recording portion which is operative to modulate a recording laser light in response to a modulated video signal V" obtained from the modulating circuit 10 and cause a modulated recording laser light, namely, a recording laser light varying in its intensity in response to the contents of the delayed video signal V' to impinge on the spiral grooove 1a on the disc 1 so as to record each segment of one field or frame period of the delayed video signal V' during each turn of the disc 1 successively to form a spiral record track, and a reading portion which is operative to cause a reading laser light to impinge on the spiral groove 1a on the disc 1 and then detect the reading laser light reflected from the disc 1 to read the horizontal and vertical reference signal components $S_H$ and $S_V$ recorded on the disc 1.

An output end of the optical head assembly 12, more particularly, an output end of the reading portion in the optical head assembly 12 is connected to an input end of a reproduced signal generating circuit 13 which has a couple of output ends, one of which is connected to both of one input end of a phase comparing circuit 14 and a third input end of the disc rotation control circuit 8, and the other of which is connected to a fourth input end of the disc rotation control circuit 8.

Further, the output end of the variable delay circuit 9 is connected also to an input end of a horizontal synchronous signal separating circuit 15 having its output end connected to the other input end of the phase comparing circuit 14. An output end of the phase comparing circuit 14 is connected to an input end of a control signal generating circuit 16 and an output end of the control signal generating circuit 16 is connected to a control end of the variable delay circuit 9.

In the embodiment of FIG. 1 thus constituted, the video signal V is supplied from the input terminal 5 to both the horizontal and vertical synchronous signal separating circuit 6 and 7, and horizontal and vertical synchronous signals $F_H$ and $F_V$ are obtained from the horizontal and vertical synchronous signal separating circuits 6 and 7, respectively, to be supplied to the disc rotation control circuit 8.

On the other hand, a detected output of the reading laser light reflected from the disc 1, namely, an output read from the disc 1 is obtained from the reading portion in the optical head assembly 12 to be supplied to the reproduced signal generating circuit 13. In the reproduced signal generating circuit 13, the output read from the disc 1 is appropriately processed to produce a reproduced horizontal reference signal component $S_H'$ at one output end of the reproduced signal generating circuit 13 and a reproduced vertical reference signal component $S_V'$ at the other output end of the reproduced signal generating circuit 13. These horizontal and vertical reference signal components $S_H'$ and $S_V'$ are supplied to the disc rotation control circuit 8.

In the disc rotation control circuit 8, phase comparison between the vertical synchronous signal $F_V$ and the reproduced vertical reference signal component $S_V'$ and phase comparison between the horizontal synchronous signal $F_H$ and the reproduced horizontal reference signal component $S_H'$ are carried out to produce a control signal $S_1$ in response to the results thereof. The control signal $S_1$ is supplied to the control end of the disc rotating motor 3 to control the rotation of the same, consequently, the rotation of the disc 1 so that the phase of the reproduced vertical reference signal component $S_V'$ coincides with the phase of the vertical synchronous signal $F_V$ and further the phase of the reproduced horizontal reference signal component $S_H'$ also coincides with the phase of the horizontal synchronous signal $F_H$.

As a result of such rotation control for the disc 1, the time base of the video signal recorded on the disc 1 is controlled in accordance with the vertical and horizontal reference signal components $S_V$ and $S_H$ so that the vertical and horizontal synchronous signals in the video signal recorded on the disc 1 are synchronized with the vertical and horizontal reference signal components $S_V$ and $S_H$, respectively.

However, notwithstanding such control as described above, in the case where the disc 1 has an eccentric center of rotation, it is next to impossible in practice to make the phase of the horizontal synchronous signal in the video signal recorded on the disc 1 coincide thoroughly with the phase of the horizontal reference signal component $S_H$. Accordingly, in the embodiment shown in FIG. 1, the time base of the video signal V is controlled by the circuit arrangement surrounded by a broken line in FIG. 1 in such a manner as explained hereinafter to become the delayed video signal V' and the delayed video signal V' is recorded on the disc 1 so that the phase of the horizontal synchronous signal in the video signal recorded on the disc 1 coincides with the phase of the horizontal reference signal $S_H$.

For the purpose of time base control, the video signal V from the input terminal 5 is supplied also to the variable delay circuit 9 and the delayed video signal V' obtained from the variable delay circuit 9 is supplied to the horizontal synchronous signal separating circuit 15. A horizontal synchronous signal $F_H'$ is extracted from the delayed video signal V' at the horizontal synchronous signal separating circuit 15 and supplied to one of the input ends of the phase comparing circuit 14. Then, the reproduced horizontal reference signal component $S_H'$ is supplied to the other of the input ends of the phase comparing circuit 14 and phase comparison between the horizontal synchronous signal $F_H'$ and the reproduced horizontal reference signal component $S_H'$ is carried out therein to produce an output $S_2$ varying in response to the phase difference between both signals $F_H'$ and $S_H'$ to be supplied to the control signal generating circuit 16. The control signal generating circuit 16 produces from the output $S_2$ of the phase comparing circuit 14 a control signal $S_3$ and supplies the same to the control end of the variable delay circuit 9. With the control signal $S_3$, the variable delay circuit 9 is controlled to delay the video signal V so that the phase of the horizontal synchronous signal $F_H'$ coincides with the phase of the reproduced horizontal reference signal component $S_H'$. As a result of this, the delayed video signal V' containing therein the horizontal synchronous signal $F_H'$ with its phase coincident with the phase of the reproduced horizontal reference signal component $S_H'$ is obtained at the output end of the variable delay circuit 9.

The delayed video signal V', the time base of which is thus controlled on the basis of the reproduced horizontal reference signal component $S_H'$, is supplied to the modulating circuit 10 to be subjected to the frequency modulation therein and produce the modulated video signal V'' at the output end of the modulating circuit 10. This modulated video signal V'' is amplified to be a predetermined level in the recording amplifier 11 and then supplied to the recording portion in the optical head assembly 12. The recording portion in the optical head assembly 12 is operative to record optically the delayed video signal V' on the recording surface of the disc 1 in the form of the modulated video signal V'''. As a result, the phase of the horizontal synchronous signal in the video signal recorded on the disc 1 is held to coincide with the phase of the horizontal reference signal component $S_H$, even though the disc 1 has the eccentric center of rotation.

Then, considering the horizontal period alignment in the spiral record track on the disc 1 in the case where the video signal is recorded by the embodiment shown in FIG. 1 in the above mentioned editing manner, since the delayed video signal V' is recorded on the disc 1 with the horizontal synchronous signal $F_H'$ having the phase always held to coincide with the phase of the horizontal reference signal component $S_H$ in the embodiment shown in FIG. 1, both the horizontal synchronous signal $F_H'$ in the delayed video signal V' recorded on the disc 1 before the disc 1 is unloaded once from the disc holding portion 2 and the horizontal synchronous signal $F_H'$ in the delayed video signal V' recorded on the disc 1 after the disc 1 is reloaded on the disc holding portion 2 are synchronized with the horizontal reference signal component $S_H$, and therefore the horizontal period alignment in the spiral record track on the disc 1 is properly established.

Although the horizontal synchronous signal $F_H'$ in the delayed video signal V' is supplied to one of the input ends of the phase comparing circuit 14 in the embodiment shown in FIG. 1, it is possible to have such an arrangement as to supply the horizontal synchronous signal $F_H$ in the video signal V from the input terminal 5, in place of the horizontal synchronous signal $F_H'$, to one of the input ends of the phase comparing circuit 14.

Figure 3:
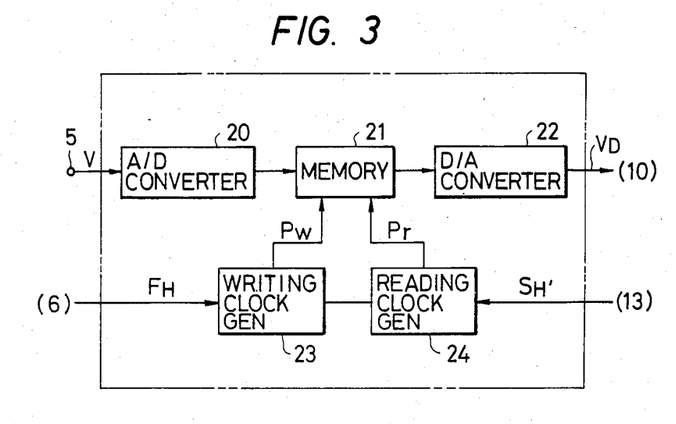
FIG. 3 is a schematic block diagram showing a circuit arrangement usable in place of a portion of the embodiment shown in FIG. 1.

Further, it is also possible to use a circuit arrangement as shown in FIG. 3 in place of the circuit arrangement surrounded by the broken line in FIG. 1 in order to cause the time base of the video signal V to be subjected to digital control.

In case of employing the circuit arrangement shown in FIG. 3, the video signal V from the input terminal 5 is supplied to an analog to digital converter (A/D converter) 20 and converted into a digitized signal to be supplied to a memory 21. A writing clock generating circuit 23, an input end of which is connected to the output end of the horizontal synchronous signal separating circuit 6, is provided for producing a writing clock pulse $P_w$ at every rising edge of the horizontal synchronous signal $F_H$, for example, and supplying the same to one of control ends of the memory 21. With this writing clock pulse $P_w$, the digitized video signal V is memorized in the memory 21. Further, a reading clock generating circuit 24, an input end of which is connected to the output end of the reproduced signal generating circuit 13, is provided for producing a reading clock pulse Pr at every rising edge of the reproduced horizontal reference signal component $S_H'$ from the reproduced signal generating circuit 13, for example, and supplying the same to the other of the control ends of memory 21. With this reading clock pulse Pr, the digitized video signal V is read from the memory 21 to be supplied to a digital to analog converter (D/A converter) 22 having its output end connected to the input of the modulating circuit 10 and recoverted into a video signal $V_D$ in the analog form.

In such a manner as described above, the time base of the video signal V is controlled on the basis of the reproduced horizontal reference signal component $S_H'$ and the video signal $V_D$ containing therein the horizontal synchronous signal with its phase coincident with the phase of the reproduced reference signal component $S_H'$ is obtained to be recorded on the disc 1.

Incidentally, the frequency of the horizontal reference signal component $S_H$ can be set to be different from the frequency of the horizontal synchronous signal $F_H$, for example, a lower frequency obtained by dividing the frequency of the horizontal synchronous signal $F_H$.

Figure 4:
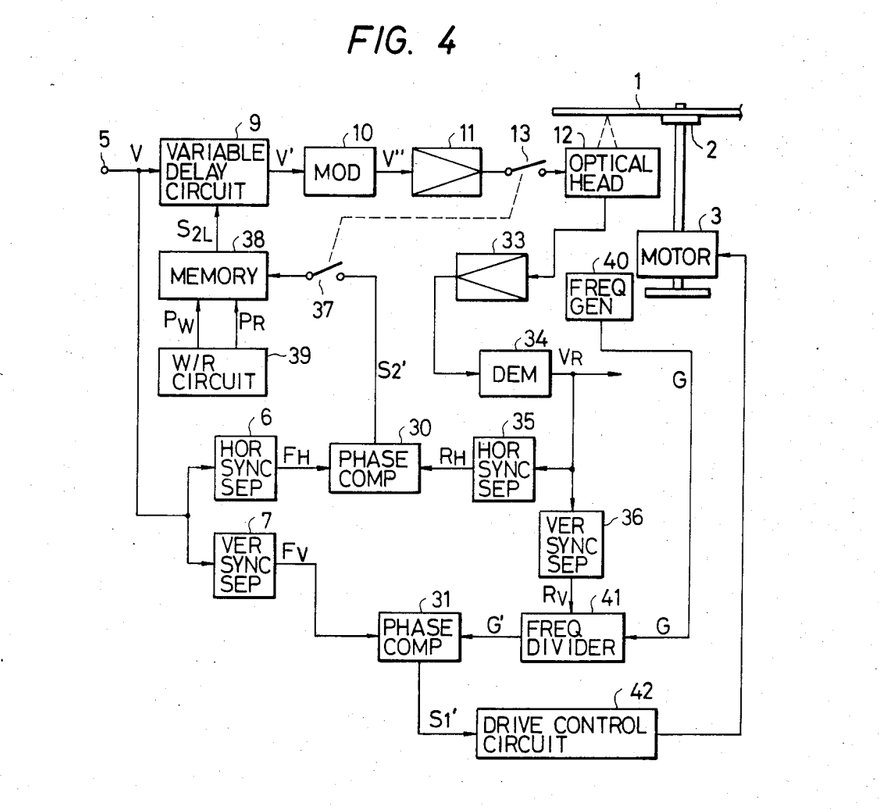
FIG. 4 is a schematic block diagram showing another embodiment of video signal recording and reproducing apparatus accordin to the present invention.

FIG. 4 shows another embodiment of video signal recording and reproducing apparatus according to the present invention. This embodiment is formed also into the optical video signal recording and reproducing apparatus used with the disc available for inscribing similarly to the embodiment shown in FIG. 1.

In FIG. 4, signals, blocks and parts corresponding to those of FIG. 1 are marked with the same references and further description thereof will be omitted. In the embodiment shown in FIG. 4, a frequency generator 40 is provided in connection with the disc rotating motor 3 for generating a pulse signal having its frequency corresponding to the rotating speed of the latter. Further, the recording portion in the optical head assembly 12 is connected through a switch 32 to the output end of the recording amplifier 11, and the reading portion in the optical head assembly 12 is operative to cause the reading laser light to impinge on the spiral record track on the disc 1 and detect the reading laser light reflected from the disc 1 to read each segment of one field or frame period of the video signal recorded in the spiral track on the disc 1 during each turn of the disc 1 successively.

The output end of the reading portion in the optical head assembly 12 is connected through a reproducing amplifier 33 to an input end of a demodulating circuit 34. An output end of the demodulating circuit 34 is connected to both input ends of horizontal and vertical synchronous signal separating circuits 35 and 36, and further sends out a reproduced video signal to the outside.

An output end of the horizontal synchronous signal separating circuit 35 is connected to one end of a phase comparing circuit 30, the other input end of which is connected to the output end of the horizontal synchronous signal separating circuit 6. An output end of the phase comparing circuit 30 is connected through a switch 37 which is ganged with the switch 32 to an input end of a memory 38. The memory 38 is provided with memorizing capacity sufficient to memorize the output of the phase comparing circuit 30 obtained during each turn of the disc 1, and accompanied with a writing and reading circuit 39 so as to be controlled to perform a writing or reading operation during each turn of the disc 1. An output end of the memory 38 is connected to the control end of the variable delay circuit 9.

An output end of the frequency generator 40 is connected to an input end of a frequency dividing circuit 41 having a reset end coupled with an output end of the vertical synchronous signal separating circuit 36. The frequency dividing circuit 41 is reset with the output of the vertical synchronous signal separating circuit 36 and operative to frequency-divide the pulse signal from the frequency generator 40 to produce an output signal formed with pulses appearing at every one turn or every half turn of the disc 1. An output end of the frequency dividing circuit 41 is connected to one input of a phase comparing circuit 31, the other input of which is coupled with the output end of the vertical synchronous signal separating circuit 7, and an output end of the phase comparing circuit 31 is connected through a drive control circuit 42 to the disc rotating motor 3.

In the embodiment of FIG. 4 thus constituted, the video signal supplied to the input terminal 5 is applied through the variable delay circuit 9, modulating circuit 10, recording amplifier 11 and switch 32 to the recording portion in the optical head assembly 12 to be recorded on the disc 1, and futher the video signal recorded on the disc 1 is reproduced through the reading portion in the optical head assembly 12, reproducing amplifier 33 and the demodulating circuit 34.

Now, such a case that the video signal from the input terminal 5 is recorded on the disc 1 in the editing manner, that is, the recording of the video signal is commenced with the middle of the recording surface of the disc 1 to form an additional part of the spiral record track so as to be successive to the part of the spiral record track formed previously, will be explained hereinafter.

Horizontal and vertical synchronous signals $F_H$ and $F_V$ extracted from a video signal V which is supplied to the input terminal 5 and contains a portion being to be recorded are supplied to the phase comparing circuits 30 and 31, respectively, from the horizontal and vertical synchronous signal separating circuits 6 and 7.

Then, the switch 32 is turned off and the switch 37 is turned on, so as to reproduce the video signal previously recorded on the disc 1. From the disc 1 being rotated by the disc rotating motor 3, each segment of one field or frame period of the video signal previously recorded is read during each turn of the disc 1 successively by the reading portion in the optical head assembly 12, and the output read from the disc 1 is supplied through the reproducing amplifier 33 to the demodulating circuit 34. As a result, a reproduced video signal $V_R$ is obtained from the demodulating circuit 34. This reproduced video signal $V_R$ is supplied to the vertical synchronous signal separating circuit 36 and a reproduced vertical synchronous signal $R_V$ is extracted therefrom to be supplied to the reset end of the frequency dividing circuit 41. The frequency dividing circuit 41 is reset by the reproduced vertical synchronous signal $R_V$ and operative to frequency-divide a pulse signal G supplied thereto from the frequency generator 40 so as to produce an output signal G' formed with pulses appearing at every one turn or every half turn of the disc 1 and supply the same to the phase comparing circuit 31. In the phase comparing circuit 31, phase comparison between the vertical synchronous signal $F_V$ and the output signal G' of the frequency dividing circuit 41 is carried out to produce a output signal $S_1'$ varying in response to the phase difference between both signals $F_V$ and G'.

This output signal $S_1'$ is supplied through the drive control circuit 42 to the control end of the disc rotating motor 3, and the disc rotating motor 3 is controlled in accordance with the output signal $S_1'$ so as to rotate the disc 1 in synchronism with the vertical synchronous signal $F_V$.

Further, the reproduced video signal $V_R$ is supplied to the horizontal synchronous signal separating circuit 35 and a reproduced horizontal synchronous signal $R_H$ is extracted therefrom to be supplied to the phase comparing circuit 30. In the phase comparing circuit 35, phase comparison between the horizontal synchronous signal $F_H$ and the reproduced horizontal synchronous signal $R_H$ is carried out to produce an output signal $S_2'$ varying in response to the phase difference between both signals $F_H$ and $R_H$. This output signal $S_2'$ is supplied to through the switch 37 to the input end of the memory 38. In this situation, the memory 38 is supplied with a writing clock pulse Pw from the writing and reading circuit 39, and each segment of the output signal $S_2'$ from the phase comparing circuit 30 obtained during reproduction from each turn of the spiral record track on the disc 1 is memorized in the memory 38 successively to renew the segment previously memorized therein.

When the reading position on the disc 1 by the reading portion in the optical head assembly 12 reaches the end portion of an area on the recording surface where the video signal has been previously recorded, the switch 32 and 37 are turned on and off, respectively, and the recording portion in the optical head assembly 12 commences to record the video signal on the disc 1 with a portion of the recording surface successive to the area where the video signal has been previously recorded. At the start of recording of the video signal, the output signal $S_2'$ which results from the phase comparison between the horizontal synchronous signal $F_H$ and the reproduced horizontal synchronous signal $R_H$ obtained from the last turn 1 of the spiral record track formed in the area on the recording surface where the video signal has been previously recorded, is memorized in the memory 38 as a signal $S_{2L}$. In this situation, the memory 38 is supplied with a reading clock pulse $P_R$ from the writing and reading circuit 39, and the signal $S_{2L}$ is read from the memory 38 during each turn of the disc 1 repeatedly and supplied to the control end of the variable delay circuit 9 to control the delay time thereat.

Under such a condition, the video signal V from the input terminal 5 is supplied to the variable delay circuit 9 and delayed thereat in response to the signal $S_{2L}$ from the memory 38 to become a delayed video signal V' having the time base controlled so that the horizontal synchronous signal contained therein is synchronized with the horizontal synchronous signal in the video signal recorded in the above mentioned last turn 1 of the spiral record track on the disc 1. The delayed video signal V', the time base of which is thus controlled, is supplied to the modulating circuit 10 to be subjected to the frequency modulation therein and produce a modulated video signal V''' at the output end of the modulating circuit 10. This modulated video signal V''' is supplied through the recording amplifier 11 and the switch 32 to the recording portion in the optical head assembly 12. The recording portion in the optical head assembly 12 is operative to record optically the delayed video signal V' on the recording surface of the disc 1 in the form of the modulated video signal V''' to form additional turns of the spiral track successive to the above mentioned last turn 1.

In the period of recording by the recording portion in the optical head assembly 12, the phase comparing circuit 31 is supplied with the vertical synchronous signal $F_V$ and the pulse signal G from the frequency generator 40 directly through the frequency dividing circuit 41, and an output signal resulting from phase comparison between both signals $F_V$ and G is obtained from the phase comparing circuit 31 to be supplied to the control end of the disc rotating motor 3. With this output signal obtained from the phase comparing circuit 31, the disc rotating motor 3 is controlled so as to rotate the disc 1 in synchronism with the vertical synchronous signal $F_V$. As a result, the phase of the horizontal synchronous signal in the video signal recorded in the turns of the spiral track successive to the above mentioned last turn 1 is held to coincide with the phase of the horizontal synchronous signal in the video signal recorded previously in the last turn 1, even though the disc 1 has an eccentric center of rotation. Accordingly, throughout the spiral record track on the disc 1, the horizontal period alignment is properly established. As a result of this, in reproduction of the video signal from the disc 1, undesirable jumping of the horizontal synchronous signal in the video signal reproduced from the junction area between a portion of the recording surface on the disc 1 containing the video signal previously recorded thereon and another portion of the recording surface on the disc 1 containing the video signal recorded thereon later is avoided, and crosstalk interference by the horizontal synchronous signal between the above mentioned last turn 1 of the spiral track and the next turn of the spiral track formed to be successive thereto later is substantially prevented.

Figure 5:
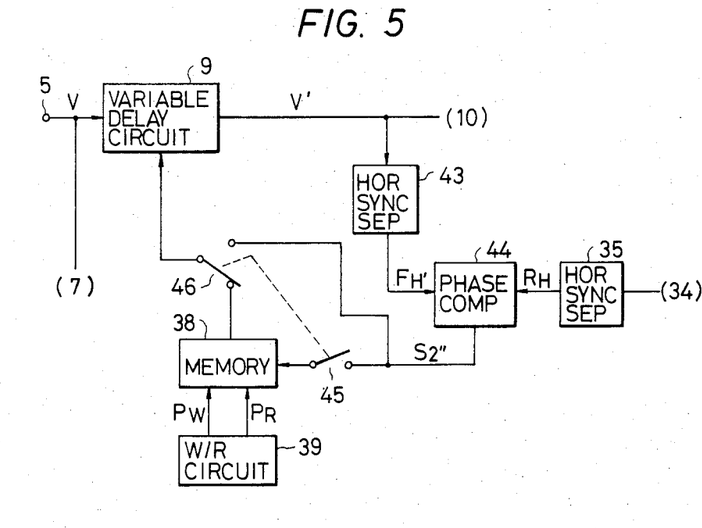
FIG. 5 is a schematic block diagram showing a circuit arrangement usable in place of a portion of the embodiment shown in FIG. 4.

In addition, it is possible to employ such a circuit arrangement as shown in FIG. 5 in place of the circuit arrangement composed of the horizontal synchronous signal separating circuit 6, phase comparing circuit 30 and switch 37 in the embodiment shown in FIG. 4. The circuit arrangement shown in FIG. 5 as a replacement comprises a horizontal synchronous signal separating circuit 43 connected to the output end of the variable delay circuit 9 for extracting the horizontal synchronous signal $F_H'$ from the delayed video signal V', a phase comparing circuit 44 for performing phase comparison between the horizontal synchronous signal $F_H'$ obtained from the horizontal synchronous signal separating circuit 43 and the reproduced horizontal synchronous signal $R_H$ and producing an output signal $S_2''$ varying in response to the phase difference between both signals $F_H'$ and $R_H$, a switch 45 connected between an output end of the phase comparing circuit 44 and the input end of the memory 38 and operatice to be turned on to supply the output signal $S_2''$ of the phase comparing circuit 44 to the memory 38 only when the video signal recorded on the disc 1 is reproduced through the reading portion in the optical head assembly 12, and a switch 46 provided for supplying to the control end of the variable delay circuit 9 with the output signal $S_2''$ of the phase comparing circuit 44 when the video signal recorded on the disc 1 is reproduced through the reading portion in the optical head assembly 12 and with the output of the memory 38 when the delayed video signal V' is recorded on the disc 1 by the recording portion in the optical head assembly 12. In case of employing this circuit arrangement shown in FIG. 5, the horizontal synchronous signal F$_H'$ in the delayed video signal V' is utilized in place of the horizontal synchronous signal F$_H$ in the video signal V and the same effect and advantages as those in the embodiment shown in FIG. 4 are obtained.

Further, in the embodiments shown in FIG. 4 and FIG. 5, the contents memorized in the memory 38 may be diminished gradually to be zero during the recording period in which the recording portion in the optical head assembly 12 records the delayed video signal V' on the disc 1. In such a case, the output of the memory 38 is prevented from becoming too large in relation to the variable delay circuit 9 in the case where the recording by the recording portion in the optical head assembly 12 is intermittently performed repeatedly.

Although the above described embodiments of the present invention are formed into optical video signal recording and reproducing apparatus used with optical discs, it is to be understood that the video signal recording and reproducing apparatus according to the present invention is not limited thereto and may be formed into apparatus of some other types.

What is claimed is:

1. Apparatus for recording and reproducing a video signal on a disc which is subject to an eccentricity capable of causing a phase error in said signal and which is provided with a record track formed thereon and for reproducing a video signal from the record track on the disc; said apparatus comprising:

a head assembly containing recording and reading portions;

disc rotating meand for driving the disc to rotate in relation to said head assembly;

input terminal means for receiving said video signal;

signal path means extending from said input terminal means to the recording portion;

first control circuit means for receiving at least a first reference signal reproduce from the disc through the reading portion and a first synchronous signal in the video signal supplied to said input terminal, and controlling said disc rotating means so as to vary the rotation thereof in response to the phase of said first synchronous signal;

variable delay means provided in said signal path for delaying the video signal supplied to said input terminal to vary the time base thereof; and second control circuit means for receiving a second reference signal reproduced from the disc through the reading portion and a second synchronous signal in the video signal in said signal path, and controlling the delay time in said variable delay means so as to cause the time base of the video signal derived from said variable delay means to vary in response to the phase of said second reference signal in such a manner as substantially to elminate said phase error due to said eccentricity.

2. Apparatus according to claim 1; further comprising means for reproducing a vertical reference signal from the disc and means for separating a vertical synchronous signal from the video signal received by said input terminal means and wherein said first control circuit means comprises phase comparing means for performing a phase comparison between said vertical reference signal and said vertical synchronous signal, and control signal generating means for producing a control signal in response to said phase comparison and supplying the control signal to said disc rotating means.

3. Apparatus according to claim 2; further comprising means for reproducing a horizontal reference signal from the disc and means for separating a horizontal synchronous signal from the video signal received by said input terminal means and wherein said first control circuit means comprises additional phase comparing means for performing an additional phase comparison between said horizontal reference signal and said horizontal synchronous signal, and said control signal generating means causes said control signal to vary in response also to said additional phase comparison.

4. Apparatus according to claim 1; wherein said first control circuit means comprises reference signal generating means for producing a third reference signal in response to a vertical horizontal signal in a reproduced video signal obtained from the disc through the reading portion in said head assembly, phase comparing means for performing a phase comparison between the third reference signal and a vertical synchronous signal separated from the video signal supplied to said input terminal, and control signal generating means for producing a control signal in response to the result of the phase comparison performed in said phase comparing means and supplying the control signal to said disc rotating means.

5. Apparatus according to claim 1; wherein said second control circuit means comprises phase comparing means for performing a phase comparison between a horizontal synchronous signal separated from the video signal derived from said variable delay means and a horizontal reference signal reproduced from the disc, and control signal generating means for producing a control signal in response to the result of the phase comparison performed in said phase comparing means and supplying the control signal to said variable delay means.

6. Apparatus according to claim 1; wherein said second control circuit means comprises phase comparing means for performing a phase comparison between a horizontal synchronous signal in a reproduced video signal obtained from the disc through the reading portion in said head assembly and a horizontal synchronous signal separated from the video signal in said signal path, memory means for memorizing the result of the phase comparison performed in said phase comparing means, and memory control means for writing said result of the phase comparison in said memory when said reproduced video signal is obtained and reading out the memorized result of the phase comparison from said memory to be supplied to said variable delay means when the video signal in said signal path is recorded on the disc through the recording portion in said head assembly.

7. Apparatus according to claim 6; wherein said memory control means comprises writing and reading circuit means for generating a writing clock pulse and a reading clock pulse and supplying them selectively to said memory means, and switching means connected between said phase comparing means and said memory means for supplying said result of the phase comparison to said memory only when said reproduced video signal is obtained.

8. Apparatus according to claim 1; wherein said variable delay means comprises an analog to digital converter for digitizing the video signal supplied to said input terminal, a memory for memorizing a digitized video signal obtained from said analog to digital converter and a digital to analog converter for converting the digitized video signal read from said memory into a video signal in analog form, and said second control circuit means comprises writing clock pulse generating means for producing a writing clock pulse synchronized with a horizontal synchronous signal separated from the video signal supplied to said input terminal to be supplied to said memory and reading clock pulse generating meand for producing a reading clock pulse synchronized with a horizontal reference signal reproduced from the disc through the reading portion in said head assembly to be supplied to said memory.

* * * * *